March 31, 1959  J. J. AMBROSE  2,879,707
AUTOMATIC BREAD TOASTER
Filed Sept. 14, 1954  4 Sheets-Sheet 1

INVENTOR.
JOHN J. AMBROSE.
BY Louis V. Lucia
ATTORNEY.

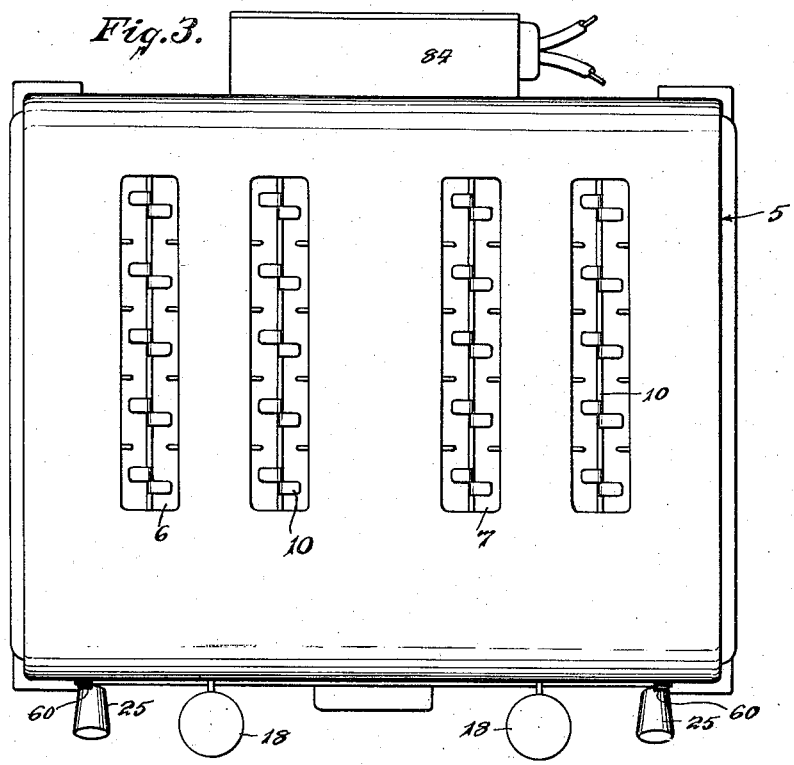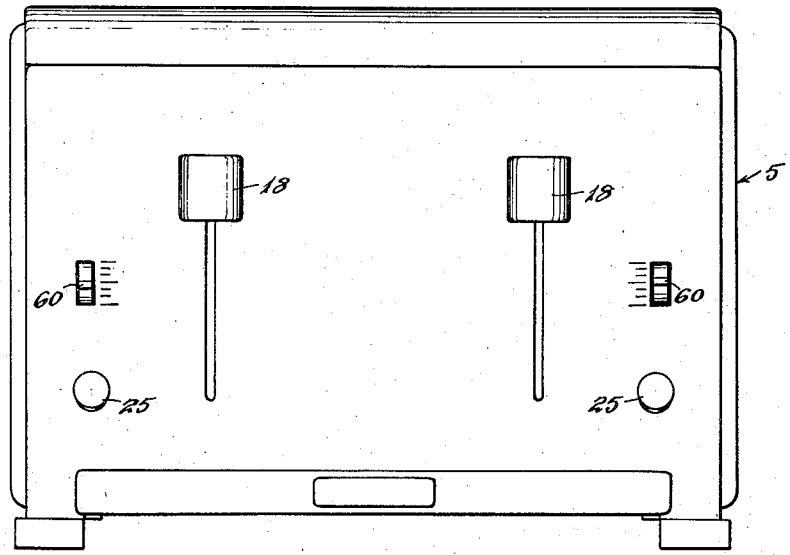

March 31, 1959
J. J. AMBROSE
2,879,707
AUTOMATIC BREAD TOASTER
Filed Sept. 14, 1954
4 Sheets-Sheet 3
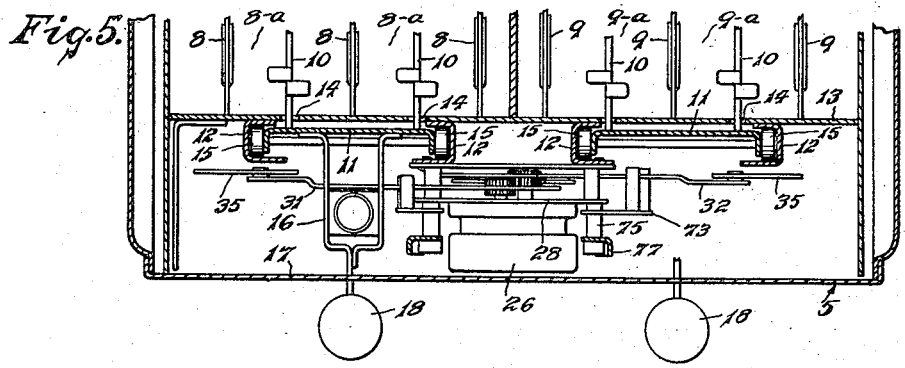
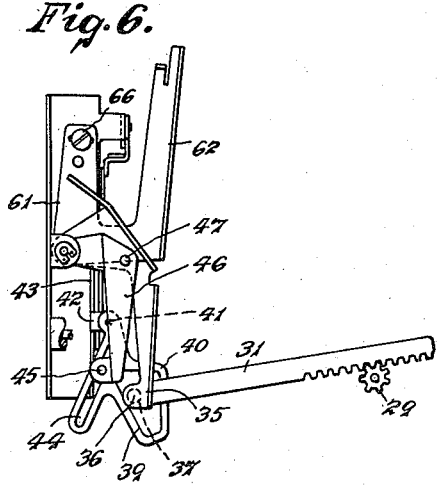
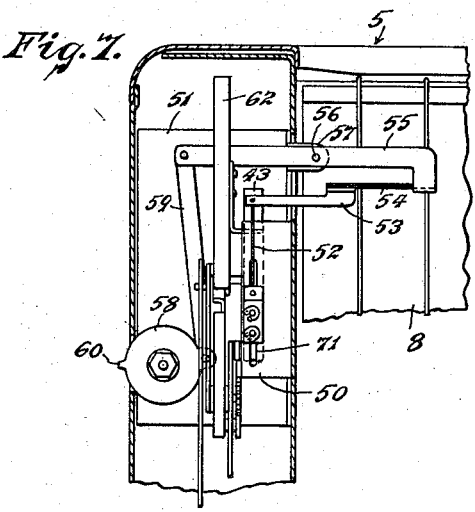
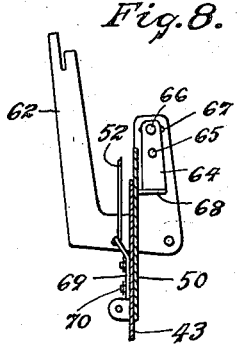
INVENTOR.
JOHN J. AMBROSE.
BY
Louis V. Lucia
ATTORNEY.

March 31, 1959  J. J. AMBROSE  2,879,707
AUTOMATIC BREAD TOASTER
Filed Sept. 14, 1954  4 Sheets-Sheet 4
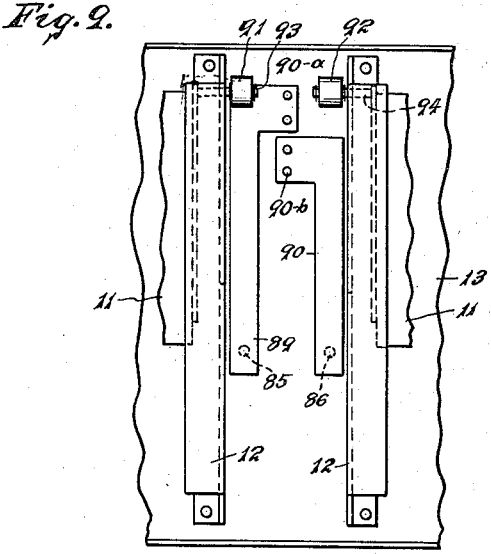
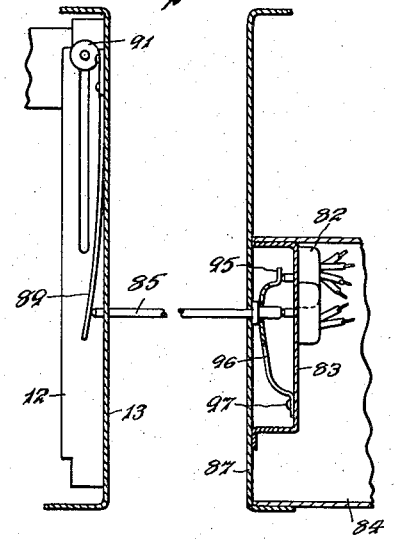
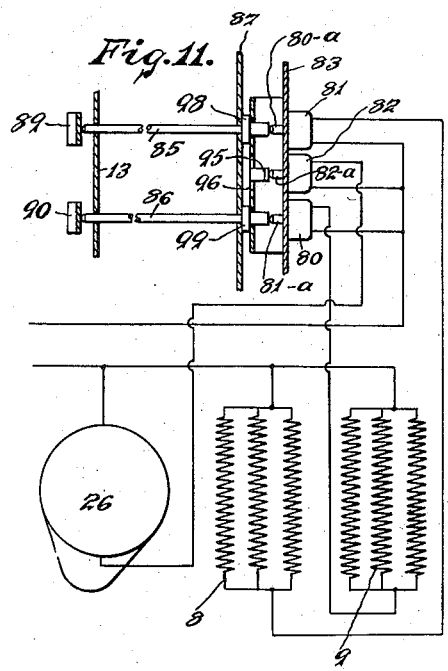
INVENTOR.
JOHN J. AMBROSE.
BY
*Louis V. Lucia*
ATTORNEY.

United States Patent Office 2,879,707
Patented Mar. 31, 1959

2,879,707
AUTOMATIC BREAD TOASTER

John J. Ambrose, Packanack Lake, N.J., assignor to Rudo Associates, Newark, N.J.

Application September 14, 1954, Serial No. 456,038

5 Claims. (Cl. 99—328)

This invention relates to an automatic bread toaster and more particularly to a bread toaster having a toasting mechanism which is controlled by a timing device for timing a toasting cycle to produce a degree of toasting in accordance with the adjustment of the toasting mechanism.

In automatic toasters of this type heretofore known, either a single timing mechanism has been used to control one or more toasting compartments simultaneously or a separate timing mechanism has been use for controlling each toasting compartment separately and individually.

It is an object of this invention to provide an automatic toaster in which two or more toasting compartments may be individually controlled by a single timing mechanism.

A further object of this invention is to provide an automatic bread toaster having a single timing device and means individually associated with each toasting compartment and connectable to the said device for controlling the toasting operation in the respective toasting compartment.

A still further object of this invention is to provide an automatic bread toaster having two or more toasting compartments, a novel thermally responsive mechanism for separately controlling the toasting operation of each toasting compartment, and a common single timing device connectable to all of the control mechanisms of the different toasting compartments for independently controlling the toasting operations in said compartment.

A further object is to provide an automatic toaster having two or more toasting compartments, a timing mechanism which may be rendered operable upon the initiation of a toasting operation in any one of the toasting compartments, which may be connected to another toasting compartment while timing the operation in the first compartment to which it was connected, and which will remain operable until the toasting operation in the last toasting compartment is completed.

Further objects and advantages of this invention will be more clearly understood from the following description and from the accompanying drawings in which:

Fig. 3 is a plan view of said toaster.

Fig. 4 is a front view thereof.

Fig. 5 is a plan view, partly in section, of the front portion of the said toaster.

Fig. 6 is a front view of one of the thermally responsive control units used in said toaster.

Fig. 7 is a side view thereof with a portion of the toaster casing being shown in vertical section.

Fig. 8 is a rear view, partly in section, of a portion of said thermally responsive control unit.

Fig. 9 is a front view showing a portion of the switch operating mechanism for said toaster.

Fig. 10 is a side view, partly in section, of said switch operating mechanism.

Fig. 11 is a plan view, partly in section, showing said switch operating mechanism and also a portion of the electrical circuit of said toaster.

Figure 1:
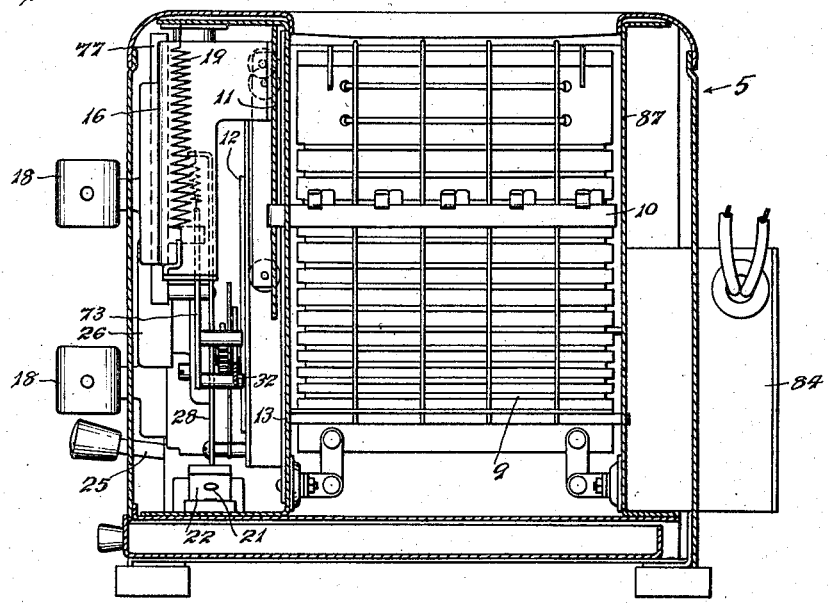
Fig. 1 is a sectional side view of an automatic bread toaster embodying my invention.

As shown in the drawings, my present invention may be embodied in an automatic toaster which includes a case 5, of known form for such toasters, that may have a plurality of toasting compartments 6 and 7, each of which contains a series of heating elements 8 and 9, respectively, between which there is provided a pair of toasting chambers 8a and 9a, having therein suitable bread carriers 10—10 for supporting a pair of bread slices in position to be toasted by the respective heating elements.

The type of toaster illustrated and described herein is particularly intended for use in restaurants and the like where a number of bread slices are toasted at the same time and it is preferred in such toasters that the toasting compartments be operative separately and independently of each other so that it will not be necessary to operate more than one toasting compartment when only one or two slices of toast are needed. It is therefore desirable in such toasters to partition the toasting compartments from each other so that each compartment may be operated as a complete unit independently of the other compartments in the toaster.

In the embodiment shown, a suitable thermostatic device is employed for controlling the operation of each of said toasting compartments independently of the other and an insulating partition is therefore provided between the pairs of chambers so that the heat from one compartment will not affect the operation of the other compartment.

In the embodiment shown, each pair of bread carriers 10—10 is jointly mounted upon a common carrier plate 11 which is vertically movable in tracks 12—12 that are mounted upon an inner wall 13 having slots 14—14 therein through which the bread carriers 10—10 project into the toasting chambers. The said plate 11 is preferably provided with suitable rollers 15, for facilitating the operation thereof, and a bracket 16 extends therefrom and through the outer wall 17 of the toaster casing. An operating handle 18 is secured to said bracket for manually moving the carrier plate downwardly to carry the bread carriers 10—10 into toasting position relatively to the respective heating elements and suitable springs 19—19 are attached to the bracket 16 for biasing the bread carrier from the toasting position towards normal position.

Each of the said carrier plates 11 has a projection 20 which extends downwardly from its bracket 16 and is adapted to project through an opening 21 in a cramping bar 22 and become cramped in said opening for retaining the carrier plate and its respective bread carriers in toasting position against the tension of the springs 19—19; the said bar 22 being pivotally anchored in a bracket 23 at one end thereof and at its other end having a spring 24 for urging it towards cramping position. A suitable lever 25 is provided at the said biased end of the cramping bar and projects through an opening in the front wall 17 of the casing so that it may be manually operated to force the biased end of the bar 22 downwardly, when it is desired to manually release the projection 20, and cause the bread carriers to be returned to their normal toasting position.

In order to automatically time the toasting cycles during the operation of such toasters, it is common to provide for each toasting chamber, or for each carrier plate, a suitable timing device which will time the toasting operation and, at the termination thereof, actuate the cramping bar 22 to cause it to release the projection 20 and thereby allow the springs 19—19 to raise the carrier plate and its respective bread carriers to withdraw the toasted slices thereon from the toasting position.

By my present invention, I am enabled to employ a single timing device for controlling the operation of both of the toasting compartments independently of each other. Such a timing device, as shown, is preferably in the form of a conventional synchronous electric motor, indicated at 26, having a base plate 27 by means of which it is mounted upon a supporting plate 28 that is secured to the tracks 12 as shown. The said synchronous motor has a pinion 29 which it rotates towards the left, as viewed in Fig. 2, and an idler pinion 30 that is rotated thereby toward the right.

Figure 2:
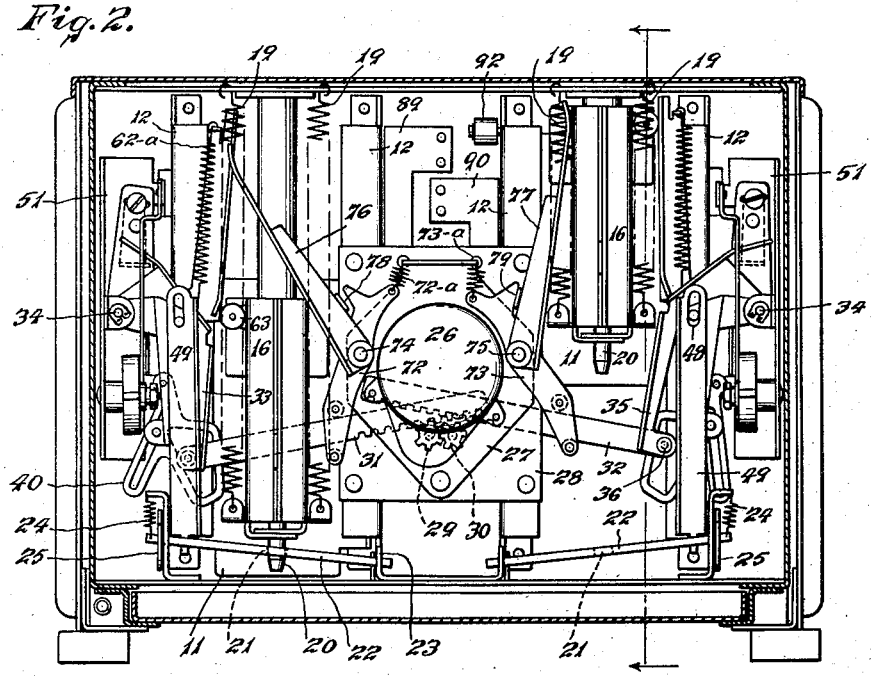
Fig. 2 is a front view of said toaster with the outer covering removed.

Associated with each carrier plate there is provided a novel mechanism that is controlled by the said motor 26 and said mechanisms include rack bars 31 and 32 which are disposed adjacent to the pinions 29 and 30, respectively, and are adapted to be moved into mesh therewith. Each of said mechanisms further includes a lever 33 which is pivoted upon the shaft 34 and has a movable extension 35 to which is pivotally secured the respective rack bar 31 or 32, by means of the pivotal connection 36, from which extends a stud 37 that projects into an opening 38 having an angularly disposed wall 39 in a lever 40 that is pivoted at 41 on a bracket 42 which extends from a supporting bar 43 for the purpose to be hereinafter more fully described. The said lever 40 has an elongated slot 44 which is disposed at an angle to the said wall 39 of the opening 38. This slot receives a stud 45 which projects from the end of a lever 46 that is also pivoted at 34 and has a stud 47 which projects therefrom into an elongated slot 48 in a releasing bar 49 that engages the movable end of the cramping bar 22 as shown in Fig. 2.

The supporting bar 43 is suspended adjacent to a clamping wall 50, that extends from one side of the bracket 51 on the inner wall 13, by means of a wire 52 which depends from an extension 53 that is secured to the free end of a thermostatic bar 54. The said thermostatic bar is anchored at its opposite end to a lever which is pivotally mounted at 56 upon a projection 57 of the bracket 51; the said lever 55 being adjustably positioned about its pivot by means of an adjusting wheel 58 that is secured to the free end of the lever by a connecting link 59 and projects through the front wall 17 of the toaster as clearly shown in Fig. 7. A suitable protrudance 60 is provided on said wheel for indicating the position thereof on the front face of the toaster and also to facilitate rotation of the wheel with the fingers when it is desired to adjust the thermostatic bar to vary the toasting operation.

A clamping lever 61 is pivotally mounted upon the shaft 34 and has an extension 62 which is disposed adjacent to the operating wheel 63 that is carried by the bracket 16. The said lever 61 carries a clamping member 64 which is pivoted thereon at 65 and is adjustable about its pivot by means of an adjusting screw 66 which projects through a slot 67 in the said lever and is threaded to the clamping member. An angular projection 68 is provided on the said clamping member to engage the supporting bar 43 and force it against the wall 50, thereby clamping said supporting bar between the said wall and the projection 68. It will be noted that the wire 52 is secured to a slide plate 69 that is attached to the supporting bar 43 by means of studs 70 which extend through a slot 71 in the wall 50.

The racks 31 and 32 are moved into and out of mesh with their respective pinions 29 and 30 by means of rocker levers 72 and 73, respectively, which are pivotally mounted upon studs 74 and 75, respectively, on the base plate 27. The said studs 74 and 75 carry the operating levers 76 and 77, respectively, which extend into the path of movement of the bracket 16 and have abutments 78 and 79, respectively, engageable with projections on the levers 72 and 73 for rocking said levers on their pivots; each of said levers being urged to move their respective rack bars 31 and 32 toward meshing position with respect to the pinions 29 and 30 by means of suitable springs 72a and 73a, respectively.

The electrical circuits for energizing the heating elements of said toaster are controlled by suitable electric switches 80 and 81 and a separate switch 82 is provided for controlling the energization of the timing motor 26.

The said switches are mounted upon a supporting panel 83 in a terminal box 84, which is mounted upon the back of the toaster, and each of said switches has an operating plunger 80a, 81a and 82a, respectively, which plungers project through the said panel. The operating plungers 80a and 81a are actuated by operating bars 85 and 86, respectively, which extend across the toaster through the rear and front inner walls 87 and 13, and are engaged at their front ends by flexible operating bars 89 and 90, respectively, which are mounted upon the said front inner plate at 90a and 90b and are engaged by operating wheels 91 and 92, respectively, that are rotatably mounted upon shafts 93 and 94, respectively, which are carired by the carrier plates 11—11. The separate switch 82 is operated by means of a projection 95 on a spring plate 96 which is secured at 97 to the panel 83. The said plate has holes through which the bars 85 and 86 extend loosely and it is actuated by flanges 98 and 99 on the said bars, respectively.

The operation of my above described automatic toaster is as follows:

The toaster is adjusted for light or dark toast by moving the protrudance 60 up or down toward the derk or light indicia on the front of the toaster. This will cause the said wheel to rock the lever 55 and thereby raise or lower the bar 43 and the lever 40 thereon so as to move the inclined walls in said lever up or down with respect to the stud 37 and thereby vary the distance which the bar 31 is required to travel before operating the said lever 40.

After the said adjustment has been made, the toaster is ready for use. Then, assuming that two bread slices are to be toasted and that they are placed upon the bread carriers 10—10 in the toasting chambers 8a and 8b, the carrier plate 11 of the left hand unit is lowered by pressing downwardly upon the button 18, and this will lower the carriers 10—10 and move the bread slices to toasting position. At the same time, the operating wheel 91, which is lowered with the carrier plate 11, will force the operating bar 89 inwardly and cause it to push the bar 85 inwardly and actuate the switch 81 to close the electric circuit and energize the three heating elements 8, as shown in Fig. 11. The inward movement of the bar 85 will also actuate the spring plate 96 and cause the projection 95 to operate the switch 82 to close the electric circuit and energize the timer motor 26.

Movement of the plate 96 by either one of the bars 85 or 86 is entirely independent of the other bar for the reason that each of said bars projects loosely through an opening in the said plate and it moves the plate by means of its flange 98 or 99 but the plate does not move the bar. Therefore, when the plate is operated by one of the bars, the other bar will remain stationary so that it will not actuate its respective switch, but operation of either of said bars will cause actuation of its said switch and also cause movement of the plate 96 and actuation of the switch 82.

Movement of the carrier plate to toasting position will also allow the lever 76 to swing downwardly, as shown in Fig. 2, and thereby release the lever 72 to the pull of the spring 72a and cause it to move the rack bar 31 into mesh with the pinion 29 of the timer motor; thus initiating the timing of the toasting operation. The rotation of the pinion 29 will then move the bar 31 toward the left and this will cause it to rock the end of the lever 33 and move the stud 36 in the opening of the lever 40, and towards the angled wall 39 thereof.

During the initial movement of the bar 31, the heat from the heating elements 8 will cause the thermostatic bar 54 to flex upwardly and gradually raise the lever 40 while the lever 33, with the stud 36 thereon, is still being moved toward the left by the timing motor. The initial portion of said movement of the lever 33 will release the lever 62 to the pull of the spring 62a and cause said lever to be pulled downwardly and thereby carry the clamping portion 68 against the bar 43 and clamp the said bar against the wall 50. The raising of the lever 40 by the thermostatic bar 54, as just described, permits the said lever to become adjusted to the temperature of the toaster at the time the toasting operation is initiated and during the initial portion of the timing period. After the said bar 43 is clamped into position and the lever 40 is in its adjusted position, the bar 31 will continue to move toward the left until the stud 36 strikes the angular side 39 of the opening in the lever 40. This will cause rocking of the said lever 40 toward the left and the said lever will then rock the lever 46 downwardly and cause the stud 47 to force the releasing bar 49 downwardly which will then move the free end of the clamping bar 22 downwardly and release the cramping projection 20; whereupon the springs 19—19 will raise the carrier plate 11 and the toasted bread slices thereon to non-toasting position. At the same time, the wheel 91 will move upwardly with the carrier plate and thereby release the bar 89, the switch actuating bar 85 and the spring plate 96 and cause the switches 81 and 82 to return to their normal position and thereby open their circuits and de-energize the timer motor 26 and the heating elements 8; whereupon the toasting cycle is completed.

It will be understood from the above description that the operation of the mechanisms for each toasting unit, or compartment, is timed by the same timing motor 26 in the same manner as above described except that they operate in opposite directions and independently of each other; thus, when the unit at the right side of the toasting device is put in operation, lowering of the carrier plate will rock the lever 77 with its extension 73 and lower the rack bar 32 into mesh with the pinion 30 which rotates in the direction opposite to that in which the pinion 29 rotates. This will move the bar 32 towards the right to operate the lever 35 of the right-hand unit in the same manner as above described, and thereby cause the same timing motor 26 to time and control the operation of the right-hand unit independently of the left-hand unit while the said motor may also be timing and controlling the operation of the left-hand unit, in which case the said motor will not be de-energized until the last toasting cycle is completed.

I claim:

1. An automatic bread toaster including a toasting compartment having a heating element therein, a bread carrier for supporting a bread slice movable into toasting and non-toasting positions and biased towards non-toasting position, means for retaining the said carrier in toasting position, a lever for releasing the retaining means, an operating member slidably connected to said lever and having an angularly disposed surface, a timing mechanism, an operating bar movable endwise by said timing mechanism and having an operating end with an abutment thereon for engaging the said surface, a second lever connected to said operating end and supporting it in operative position relatively to the angularly disposed surface of the operating member, a thermostatic member responsive to temperature changes in said toasting compartment and supporting said operating member to vary the position thereof and of the angularly disposed surface relatively to the operating bar, a third lever, clamping means carried by said third lever and movable into clamping position upon the release of said third lever for clamping the operating member in adjusted positions to vary the relation between the angularly disposed surface and the operating bar, a spring member biasing said third lever towards clamping position, abutment means between the second and third levers for causing the second lever to retain the third lever out of clamping position against the tension of the said spring member during an initial portion of the timing period, and means for manually varying the position of the operating member.

2. An automatic bread toaster including a toasting compartment having a plurality of heating elements therein with toasting chambers between said elements, a vertically movable carrier plate, supporting members projecting from said carrier plate into said toasting chambers for supporting bread slices between the heating elements, a control mechanism including an operating member having an angled surface, a thermostatic bar responsive to temperature changes in the toasting compartment for varying the position of said operating member, a clamping lever for clamping the said operating member in position, an operating lever, a timing mechanism having an operating bar connected to said operating lever and adapted to abut the angularly disposed surface of the operating member, the said operating lever being adapted to move the clamping member out of clamping position, spring means for moving said clamping lever into clamping position, manually operable means for manually adjusting the position of the operating member, means carried by the carrier plate for moving the clamping lever out of clamping position, retaining means for retaining the carrier plate in toasting position, a releasing bar operable by the operating lever to release said retaining means upon the expiration of a pre-determined time period, an electric circuit for energizing the timing device, an electric switch in said circuit, means carried by the carrier plate for causing closing of said switch when the carrier plate is moved into toasting position and causing opening of said switch when the retaining means are released and the carrier plate is moved to non-toasting position, and means actuated upon the movement of the carrier plate to toasting position for connecting the operating bar to the timing device and upon the movement of the carrier plate to non-toasting position for disconnecting said operating bar from the timing device.

3. An automatic bread toaster including a toasting compartment, a heating element in said compartment, a bread slice carrier for supporting a bread slice in toasting and non-toasting positions relatively to said heating element, means biasing said carrier into non-toasting position, means for retaining said carrier in toasting position, a mechanism for controlling the toasting operations in said compartment, and a timing device for timing the operation of said mechanism; said mechanism including a member for releasing the retaining means to cause the return of the carrier to non-toasting position, an operating bar actuated by said timing device for actuating said releasing member, a thermostatic bar responsive to temperatures in the toasting compartment, a carrier bar movable by said thermostatic bar, a connecting member pivoted on said carrier bar and having an angled surface variably engageable with the operating bar for varying the movement of the said connecting member by the operating bar and thereby varying the timing of the toasting operation in accordance with temperature changes in the toasting compartment, and means operable by said connecting member for releasing said retaining means.

4. An automatic bread toaster having a toasting compartment, a heating element in said compartment, a bread slice carrier for supporting a bread slice in said toasting compartment in toasting and non-toasting positions relatively to said heating element and biased towards non-toasting position, a control mechanism including means for retaining the said carrier in toasting position, a lever for releasing said retaining means, an operating member connected to said lever and having an angularly disposed surface, a timing device, a bar movable by said timing device into engagement with said angularly disposed surface for actuating the lever to release the retaining means, a thermally responsive member for varying the position of the operating member in accordance with temperature changes in the toasting compartment to thereby vary the distance between the angularly disposed surface and the said bar for varying the time period provided by the timing device for the toasting operation; the said operating member being connected to the operating lever by means of an elongated slot and stud connection and the angularly disposed surface being at an angle to said slot.

5. An automatic bread toaster having a toasting compartment, a heating element in said compartment, a bread slice carrier for supporting a bread slice in said toasting compartment in toasting and non-toasting positions relatively to said heating element and biased towards non-toasting position, a control mechanism including means for retaining the said carrier in toasting position, a lever for releasing said retaining means, an operating member connected to said lever and having an angularly disposed surface, a timing device having a bar movable longitudinally into engagement with said angularly disposed surface for actuating the lever to release the retaining means, a thermally responsive member for varying the position of the operating member in accordance with temperature changes in the toasting compartment to thereby vary the distance between the angularly disposed surface and the said bar for varying the time period provided by the timing device for the toasting operation; and means for manually varying the position of the operating member to vary the relation of the angularly disposed surface to the operating bar and thereby vary the time period provided by the timing mechanism.

References Cited in the file of this patent
UNITED STATES PATENTS

| | | |
|---|---|---|
| Re.22,781 | Anderson | Aug. 20, 1946 |
| 1,209,748 | Noeth | Dec. 26, 1916 |
| 1,377,984 | Lamb | May 10, 1921 |
| 1,529,342 | Christy | Mar. 10, 1925 |
| 1,665,735 | Forbes | Apr. 10, 1928 |
| 1,967,209 | Lawrence | July 17, 1934 |
| 1,987,703 | Oneill | Jan. 15, 1935 |
| 2,257,883 | McCarthy | Oct. 7, 1941 |
| 2,436,575 | Johnson | Feb. 24, 1948 |
| 2,470,548 | Desjardins | May 17, 1949 |
| 2,544,836 | Hotvedt | Mar. 13, 1951 |
| 2,557,512 | Padelford | June 19, 1951 |
| 2,567,075 | Linberg | Sept. 4, 1951 |
| 2,665,629 | Hummel | Jan. 12, 1954 |
| 2,687,078 | Ihrke | Aug. 24, 1954 |
| 2,739,523 | McCullough | Mar. 27, 1956 |